Figure 1:
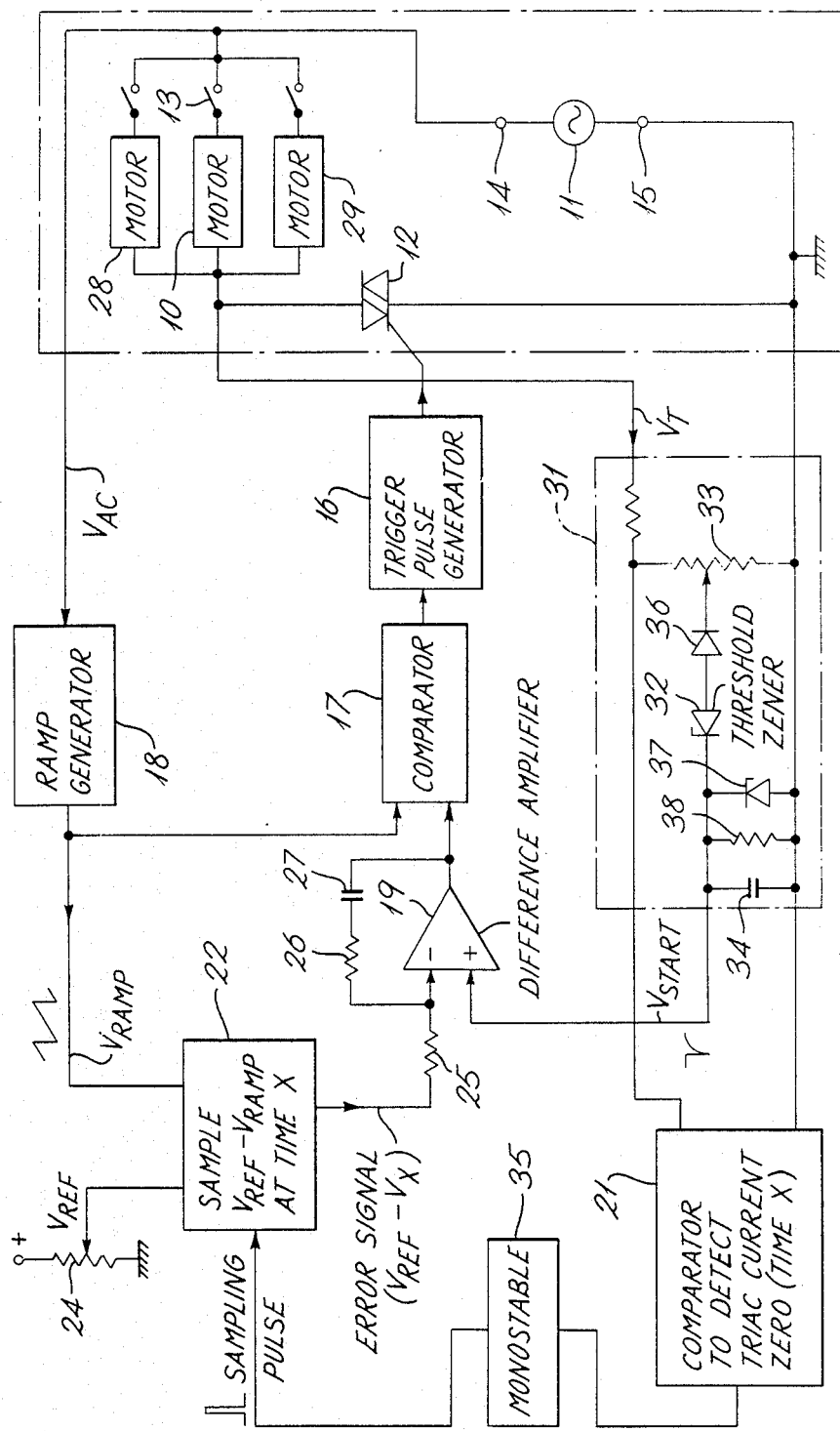

United States Patent [19]

Unsworth

[11] Patent Number: 4,800,326
[45] Date of Patent: Jan. 24, 1989

[54] APPARATUS AND METHODS FOR CONTROLLING INDUCTION MOTORS

[75] Inventor: Peter J. Unsworth, Lewes, England

[73] Assignee: National Research Development Corporation, London, England

[21] Appl. No.: 873,454

[22] Filed: Jun. 6, 1986

Related U.S. Application Data

[63] Continuation of Ser. No. 770,012, Aug. 28, 1985, abandoned, which is a continuation of Ser. No. 305,735, Sep. 25, 1981, abandoned.

[30] Foreign Application Priority Data

Sep. 26, 1980 [GB] United Kingdom ............ 8031129
Feb. 6, 1981 [GB] United Kingdom ............ 8103681
Jun. 29, 1981 [GB] United Kingdom ............ 8119931

[51] Int. Cl.$^4$ ............................................. H02P 5/40
[52] U.S. Cl. .................................. 318/729; 318/778; 318/798; 318/812
[58] Field of Search ............ 318/729, 728, 798, 800, 318/805, 802, 430, 436

[56] References Cited

U.S. PATENT DOCUMENTS

| | | |
|---|---|---|
| 3,441,823 | 4/1969 | Schlabach . |
| 3,652,924 | 3/1972 | Dieterich et al. .................. 318/807 |
| 4,052,648 | 10/1977 | Nola . |
| 4,176,307 | 11/1979 | Parker . |
| 4,190,793 | 2/1980 | Parker et al. . |
| 4,242,625 | 12/1980 | Hedges . |
| 4,243,926 | 1/1981 | Phillips . |
| 4,266,177 | 5/1981 | Nola . |
| 4,297,628 | 10/1981 | Hedges . |
| 4,298,834 | 11/1981 | Opfer ............................... 318/729 |
| 4,333,046 | 6/1982 | Lee .................................. 318/798 X |
| 4,338,557 | 7/1982 | Wanlass ............................ 318/729 |
| 4,355,274 | 10/1982 | Bourbeau ........................ 318/805 X |
| 4,361,793 | 11/1982 | Nordell ............................. 318/729 |
| 4,369,403 | 1/1983 | Lee .................................. 318/729 |
| 4,379,986 | 4/1983 | Baxter et al. .................... 318/798 X |
| 4,384,243 | 5/1983 | Muskovac ........................ 318/798 X |
| 4,387,329 | 7/1983 | Harlow ............................ 318/729 |
| 4,388,578 | 6/1983 | Green et al. ..................... 318/729 |
| 4,433,276 | 2/1984 | Nola ................................. 318/729 |
| 4,469,998 | 9/1984 | Nola ................................. 318/729 |

FOREIGN PATENT DOCUMENTS

| | | |
|---|---|---|
| 0051903 | 5/1982 | European Pat. Off. . |
| 2730774 | 1/1978 | Fed. Rep. of Germany . |
| 2824474 | 4/1979 | Fed. Rep. of Germany . |
| 8002895 | 12/1980 | PCT Int'l Appl. . |
| 8103586 | 12/1982 | PCT Int'l Appl. . |
| 2006484 | 5/1979 | United Kingdom . |
| 1551644 | 8/1979 | United Kingdom . |
| 2073921 | 11/1981 | United Kingdom . |
| 2079500 | 1/1982 | United Kingdom . |
| 2080580 | 2/1982 | United Kingdom . |

OTHER PUBLICATIONS

NASA Tech. Briefs, Summer 1980, vol. 5, No. 2, MFS 25323.
NASA Tech Brief No. MFS-23280 Apr. 1979.
Frank J. Nola, Improved Power-Factor Controller, Technical Support Package Summer 1980, NASA Tech. Briefs, vol. 5, No. 2, 3 pages of Tech Briefs, pp. 1-7.

(List continued on next page.)

Primary Examiner—David Smith, Jr.
Attorney, Agent, or Firm—Cushman, Darby & Cushman

[57] ABSTRACT

When induction motors are lightly loaded their power factors and efficiency are poor but in the present invention power factor is controlled regardless of load. An induction motor is connected by way of a triac to a supply. The voltage across the triac is monitored by a comparator for voltage steps which correspond to current turn-off and a signal is developed at the output of an amplifier which represents error from required phase lag. A further comparator and a trigger pulse generator trigger the triac in accordance with the error. An override circuit overrides the control system during starting. A number of further induction motors may be connected in parallel with the motor. Additional circuits deal with problems arising when a three-phase induction motor is connected by three wires only.

19 Claims, 6 Drawing Sheets

OTHER PUBLICATIONS

Frank J. Nola, Fast-Response Power Saver for Induction Motors, NASA Tech Briefs, Spring 1979, pp. 10 and 11.
Frank J. Nola, Save Power in AC Induction Motors, NASA Tech Briefs, Summer 1977, pp. 8 and 9.
Elektor, pp. 1139–1141 (Nov. 1980) No. 11, vol. 7, Cantebury, Great Britain.
IEEE Transactions on Power Apparatus and Systems, vol. PAS-99, No. 4, Jul./Aug. 1980.
Elektrotechnische Zeitschrift, p. 1397 (Nov. 1979) vol. 100, No. 24.
Energy User News, "Stability Solution Claimed for Some PF Controllers," Sep. 8, 1980.

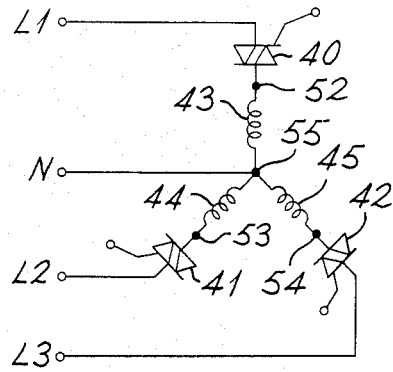
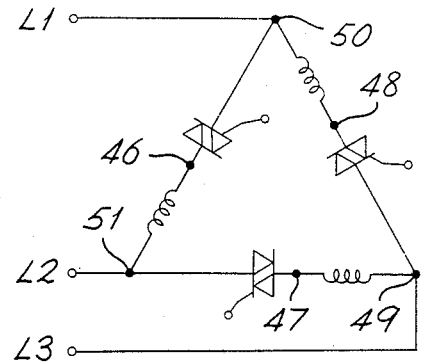
Fig. 3a
Fig. 3b
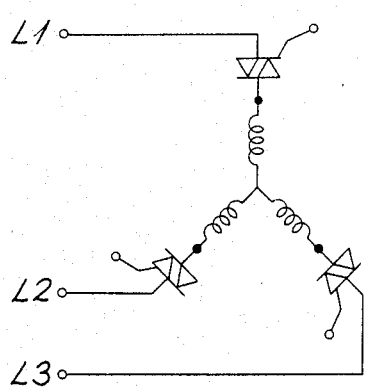
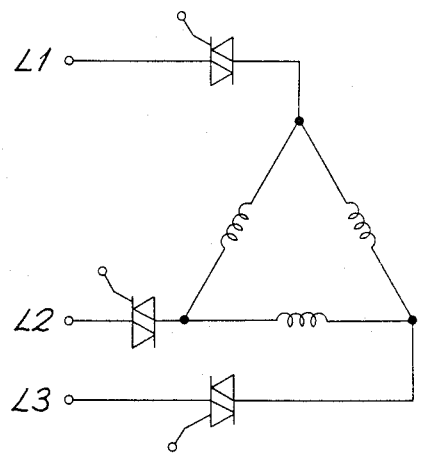
Fig. 3c
Fig. 3d

APPARATUS AND METHODS FOR CONTROLLING INDUCTION MOTORS

This is a continuation of application Ser. No. 770,012, filed Aug. 28, 1985, which was abandoned upon the filing hereof, which was a continuation of Ser. No. 305,735, filed Sept. 25, 1981, which was abandoned.

The present invention relates to apparatus and methods for controlling a power supply circuit for an induction motor to optimise power consumption.

The power consumption W of a single phase induction motor is $W = VI \cos \phi$, where V and I are the r.m.s. supply voltage and current drawn, and $\phi$ is the phase lag of the current behind the voltage waveform. At rated load the phase lag is small so that the power factor $\cos \phi$ is approximately equal to one but at well below rated load, the power consumption decreases partly because the motor draws reduced current but more importantly because the phase lag $\phi$ increases and reduces the power factor. This reduces the efficiency of the motor because losses from resistive heating and hysteresis are not reduced in proportion to power consumption. Similar effects occur in three phase induction motors.

According to a first aspect of the present invention there is provided a power controller for an induction motor comprising one or more switching means for connection between an alternating current electrical supply and an induction motor which is to be energised from the supply, there being one switching means for the, or each, phase of the supply, and the or each switching means becoming conductive when a trigger signal is applied to that switching means and remaining conductive until the current supplied thereto ceases, monitor means for deriving a monitoring signal representative of respective intervals between a zero in the voltage waveform of the, or at least one, phase of the supply and the next final cessation of current in that phase before current reversal therein, means for generating a time-reference signal representative of time elapsed since the last said zero in voltage, and control means for generating the trigger signals, the control means being responsive to a comparison between the values of the monitoring signal and the time-reference signal to change the time relationship between the supply waveform and the trigger signals in that sense which shortens the conduction period of the switching means when the said interval tends to increase and vice versa.

According to a second aspect of the present invention there is provided a method of controlling an induction motor comprising the steps of supplying the induction motor from an alternating current electrical supply by way of one or more switching means connecting the motor to the supply when trigger signals are applied to the switching means, there being one switching means for the, or each, phase of the supply, the or each switching means becoming conductive when triggered and remaining conductive until current supplied thereto ceases, generating a monitoring signal representative of respective intervals between a zero in the voltage of the, or at least one, phase of the supply and the next final cessation of current in that phase before current reversal therein, generating a time-reference signal representative of time elapsed since the last said zero in voltage, and generating the trigger signals, the time relationship between the trigger signals and the supply waveform being changed, in response to a comparison between the values of the monitoring signal and the time-reference signal, in that sense which shortens the conduction period of the switching means when the said interval tends to increase the vice versa.

The main advantage of the present invention is that it effectively produces the same result as a reduction in the supply voltage V when the motor power requirement falls so that the power factor and efficiency of the motor remain high, irrespective of motor loading. Motors have been observed to consume up to 70% less energy depending on loading, when the invention is used.

For a single phase motor the monitor means may comprise means for detecting steps in the voltage across the switching means which occur when the switching means ceases to conduct, and means for providing a signal which is representative of the time interval between a zero crossing in the supply voltage and the time at which the said voltage step occurs. A signal so provided is subtracted from a reference signal before application to the control means and adjustment of the reference signal sets the phase lag. Corresponding arrangements may be made for three phase motors to provide either a monitoring signal derived from one phase, or preferably an average monitoring signal derived from all three phases.

For single phase motors, the control means may comprise a ramp generator for generating a ramp signal having a repetition frequency equal to twice the frequency of the supply and having return waveform edges which are synchronized with the zero crossings in the supply voltage, and a comparator for comparing the ramp signal with the monitor signal or a signal dependent thereon to provide a trigger pulse when the comparator input signals bear a predetermined magnitude relationship to one another. For three phase motors one ramp generator and one comparator may be provided for each phase.

The time-reference signal may be the, or one of ramp signals mentioned above and the monitoring signal may be obtained by sampling the ramp signal at the instant a said cessation of current occurs.

This method of phase lag measurement by sampling which may be used without using the voltage across the, or one of the, switching means to derive a monitoring signal representative of the said interval, has important advantages over methods in which pulse length or the mark/space ratio of a pulse signal initially represents the phase lag and integration or capacitive smoothing is used to provide a further signal in which amplitude represents phase lag. Methods involving integration or smoothing introduce phase lag in the feedback system formed by the power controller and the motor and this can make stabilisation of the feedback control loop impossible. Using the new sampling technique, phase compensation (mentioned below) can be used to introduce phase lead (increase of gain with frequency) in the loop at higher frequencies (for example above 6 Hz) to neutralize the effects of cumulative phase lag in the response of the motor and controller.

According to a third aspect of the present invention there is provided a power controller for an induction motor comprising one or more switching means for connection between an alternating current electrical supply and an induction motor to be energised from the supply to connect the motor to the supply when trigger signals are applied to the switching means, there being one switching means for the, or each phase of the supply, and the or each switching means becoming conductive when triggered and remaining conductive until the current supplied thereto ceases, monitor means for deriving a monitoring signal representative of the interval between a zero in the voltage of the, or at least one of the supply phases and the next final cessation of current in that phase before current reversal therein, control means for generating the trigger signals, the control means being responsive to the monitoring signal to change the time relationship between the supply waveform and the trigger signals in that sense which shortens the conduction period of the switching means when the said interval tends to increase and vice versa, and override means for changing the said time relationship in that sense which lengthens the said conduction period when the peak voltage across the, or at least one of the, switching means increases to a value which indicates at least that the motor is stationary or tending to stall.

According to a fourth aspect of the present invention there is provided a method of controlling an induction motor comprising supplying the motor from an alternating supply by way of one or more switching means, the, or each of the, switching means connecting the motor to the supply when a trigger signal is applied to the switching means, there being one switching means for each respective phase of the supply, and the, or each, switching means becoming conductive when triggered and remaining conductive until the current supplied thereto ceases, deriving a monitoring signal representative of the phase angle between a zero in the voltage of the, or at least one of the, supply phases and the next final cessation of current supplied in that phase before current reversal therein, and generating trigger signals having a time relationship relative to the supply waveform which is responsive to the monitoring signal to shorten the conduction period of the switching means when the said interval increases and vice versa unless the peak voltage across the, or at least one of the, switching means increases to a value which indicates at least that the motor is stationary or tending to stall and then the said time relationship is changed in that sense which lengthens the said conduction period.

In all four aspects of the invention more than one motor may be connected in parallel to be supplied by way of the switching means. References to 'the motor' in the four aspects of the invention thus include the plural, references to time and phase relationship and phase angles are overall parameters, and references to stalling or a motor being stationary relate to any one motor where motors are connected in parallel.

The override means overrides the power reduction provided by the control means and applies the full supply voltage to a motor which is to be started and this voltage is applied while the motor speeds up. The override means thuse enables a single power controller circuit to run many single phase motors in parallel and still save power. It also ensures the necessary full power for starting transients when one or more single phase motors are started from rest. Any tendency of any of the motors to stall due to sudden abnormal loading or supply voltage fluctuation causes the override means to operate and prevents stalling. Arrangements for starting a number of three phase motors in parallel are described later.

The override means may comprise a rectifying diode and a Zener diode connected to the junction between the, or one of the, switching means and the motor, and a capacitor in series with the Zener diode. When the voltage applied to the Zener diode exceeds the Zener voltage the capacitor starts to change, and the voltage across the capacitor provides the override signal. The rectifier diode prevents discharging and reverse charging of the capacitor during the reverse half cycle of the supply.

The override signal may be combined with the monitoring signal at the input to a differential amplifier, their amplified difference being applied to control the time relationship between the supply voltage and the trigger pulses.

Problems arises in the control of three phase motors connected by three wires only (the neutral connection being omitted) to a controller comprising switching means and to a supply, such as the controller of the first and third aspects of the present invention.

The present inventor has found one of these problems to occur when whilst one switching means, such as a triac, is non-conducting the current in a second switching means also becomes zero. With two non-conducting switching means and only a three wire connection there is no continuous path for current through the third switching means and current in this switching means also ceases. Since all three switching means are now non-conducting the motor is switched off and even if subsequently the three switching means are individually fired in sequence there remains no current path and the motor remains off. Thus the moment two switching means become non-conducting, the third switching means is switched off and the motor ceases to operate.

This situation occurs whenever the off periods of two switching means overlap during reduction of power to the motor by phase control such as is described above and is also used in other known methods of induction motor control. The situation can also occur if one switching means fails to conduct just before a second switching means becomes non-conducting, for example due to a momentary interruption of the supply from a sliding pick-up contact.

The present inventor has also discovered that another of the above mentioned problems is due to circumstances which may arise and cause erroneous measurement of phase lag between the supply voltage and supply current. Variations in phase lag accompany changes in the motor load and are used to determine when the switching means should be trigger to meet motor load variations.

These circumstances arise when two switching means turn off, since then the resulting turn off and cessation of current in the third switching means does not occur at the natural phase lag value. Rather, it is imposed by the off state of the other two switching means and leads to inaccurate phase lag measurement and subsequent failure of control circuits.

According to a fifth aspect of the present invention therefore there is provided a power controller for three phase induction motors supplied by way of three wires only, comprising three switching means, each for a respective supply phase and being, in operation, connected between that phase of a three phase supply and a respective terminal of a star or delta connected induction motor, each switching means being capable of passing current from the moment when a primary or secondary trigger signal reaches that switching means until current applied thereto ceases, monitoring means for generating a monitoring signal representative of the interval between a zero in the voltage of at least one phase of the supply and the next final cessation of current in that phase before current reversal therein, control means for generating primary trigger signals for the switching means of respective supply phases, the control means being responsive to the monitoring signal to change the time relationships between the supply waveform and the primary trigger signals in that sense which shortens the conduction period of the switching means when the said interval tends to increase and vice versa, and the control means also being constructed to generate secondary trigger signals at the same time as primary trigger signals, each secondary trigger signal being applied to that switching means which received the last primary trigger signal.

According to a sixth aspect of the present invention there is provided a method of controlling a three phase star or delta connected induction motor when the motor is supplied by way of three wires only, comprising the steps of supplying the induction motor from a three phase alternating current electrical supply by way of three switching means, each for a respective supply phase and connecting that phase to a respective terminal of the star or delta connection of the motor when primary or secondary trigger signals are applied thereto, each switching means conducting from the moment when a primary or secondary trigger signal reaches that switching means until current applied thereto ceases, generating a monitoring signal representative of the interval between a zero in the voltage of at least one phase of the supply and the next final cessation of current in that phase before current reversal therein, generating primary trigger signals for the respective switching means in the reverse phase sequence to that in which the supply voltages attain maximum magnitude, in response to the monitoring signal to change the time relationships between the supply waveform and the primary trigger signals in that sense which shortens the conduction period of the switching means when the said interval tends to increase and vice versa, and generating secondary trigger signals for the switching means of a supply phase at the same time as the primary trigger signal for the switching means of the next phase in the said reverse phase sequence.

The first of the above mentioned problems is overcome by generating a secondary trigger signal each time a primary trigger signal is generated. In this way a path is created for current through the two switching means receiving the simultaneous primary and secondary trigger signals. The switching means which receives the secondary triggering signal is that switching means which received the previous primary trigger signal.

According to a seventh aspect of the present invention there is provided a power controller for a three phase induction motor supplied by way of three wires only, comprising three switching means, each for a respective supply phase and being, in operation, connected between that phase of a three phase supply and a respective terminal of a star or delta connected induction motor, each switching means being capable of passing current from the moment when a trigger signal reaches that switching means until current applied thereto ceases, monitor means for generating a monitoring signal representative of the interval between a zero in the voltage of at least one phase of the supply and the next final cessation of current in that phase before current reversal therein, control means for generating trigger signals for the switching means, the control means being responsive to the monitoring signal to change the time relationships between the supply waveform and the trigger signals in that sense which shortens the conduction period of the switching means when the said interval tends to increase and vice versa, and means for suppressing generation or use of the monitoring signals whenever current through a switching means ceases but next flows again in the same direction.

According to an eighth aspect of the present invention there is provided a method of controlling a three phase star or delta connected induction motor when the motor is supplied by way of three wires only, comprising the steps of supplying the induction motor from a three phase alternating current electrical supply by way of three switching means, each of which when triggered by a trigger signal connects one phase of the supply to a respective terminal of the star or delta connection, each switching means being capable of passing current from the moment when a trigger signal reaches that switching means until current applied thereto ceases, generating a monitoring signal representative of the interval between a zero in the voltage of at least one phase of the supply and the next final cessation of current in that phase before current reversal therein, generating trigger signals for the respective switching means in response to the monitoring signals to change the time relationship between the supply waveform and the primary trigger signals in that sense which shortens the conduction period of the switching means when the said interval tends to increase and vice versa, and suppressing the generation, or the use, of the monitoring signals whenever current through a switching means ceases but next flows again in the same direction.

Use of the seventh and eighth aspects of the invention allows the second problem to be overcome since erroneous phase lag measurements are suppressed.

Preferably, one monitoring signal is generated for each supply phase, and then the generation, or the use, of the monitoring signal for each respective phase is suppressed when the preceding phase in the sequence in which the phase supply voltages go positive, is not conducting.

Although power controllers and methods of control according to the invention are suitable for three wire only connections to motors, they may be used in four or six wire connections.

Figure 4:
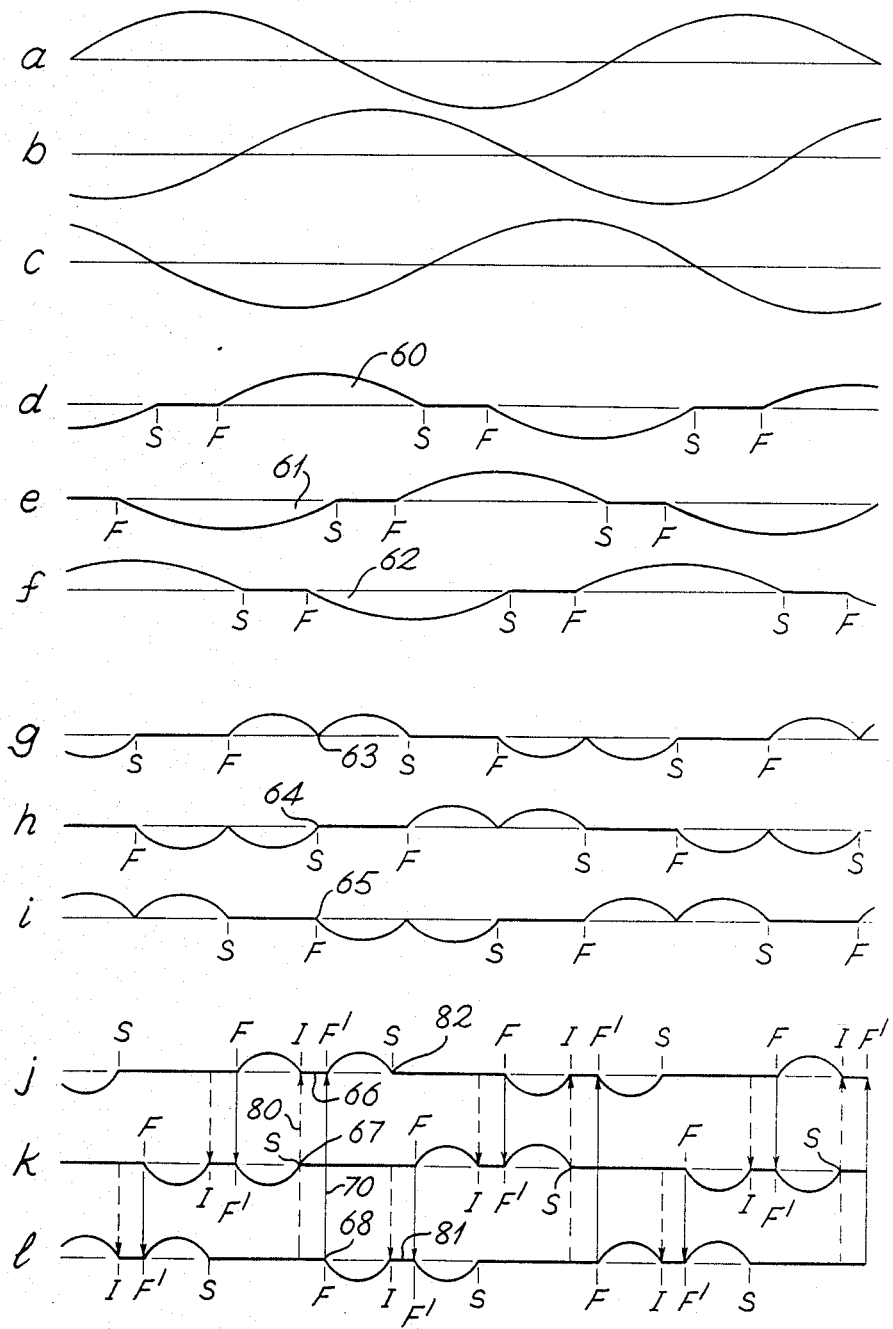
Figure 5:
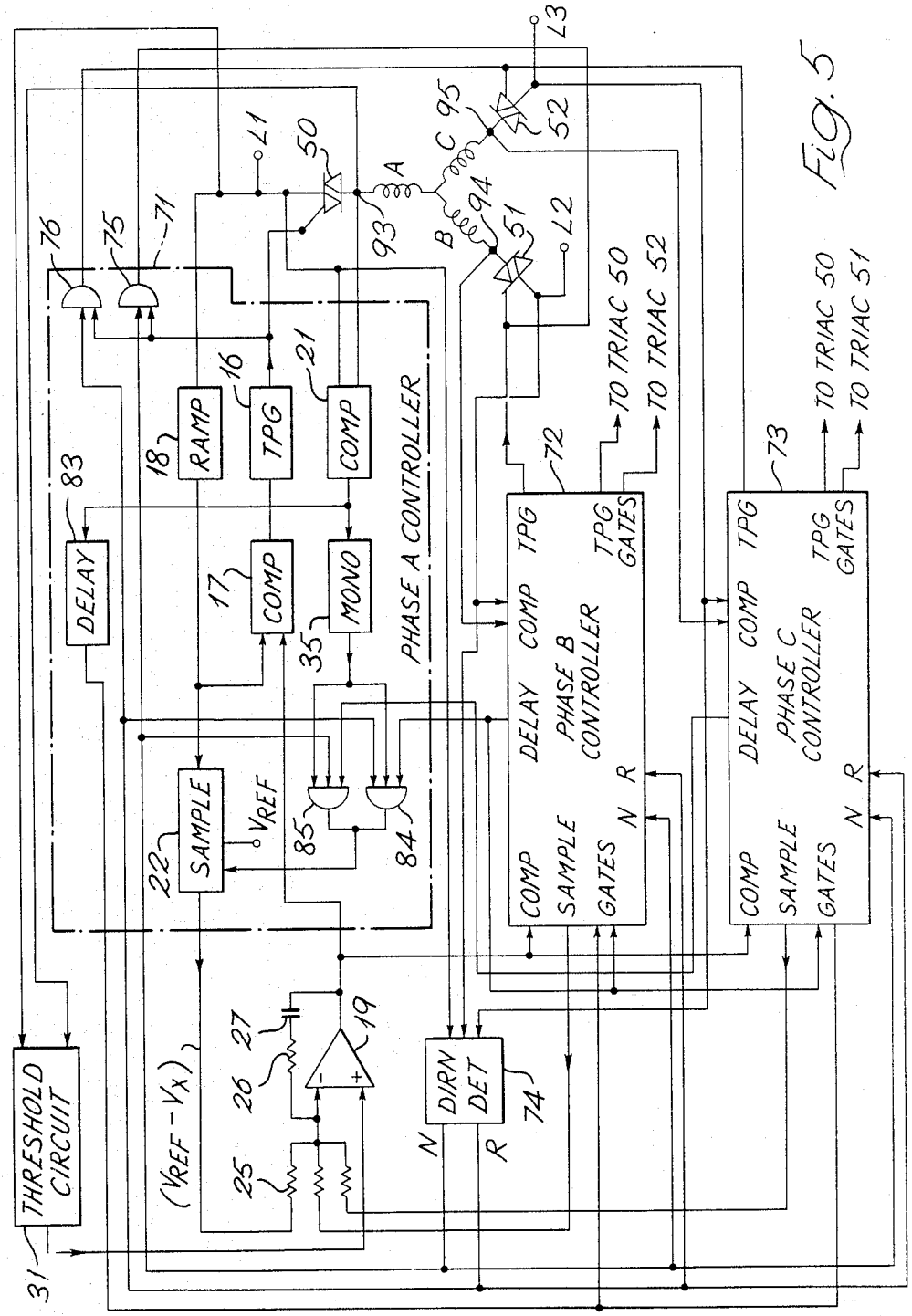
Figure 6:
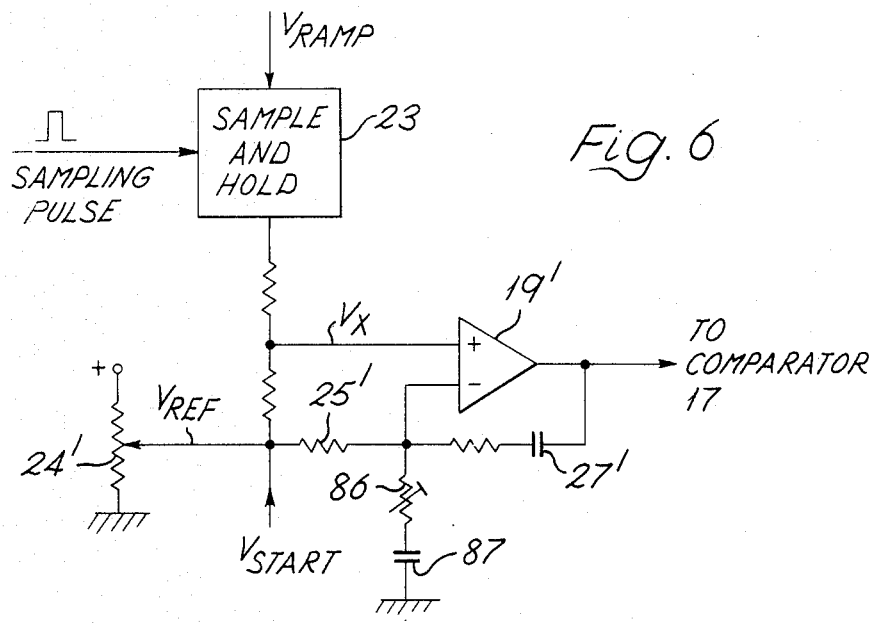
Figure 7:
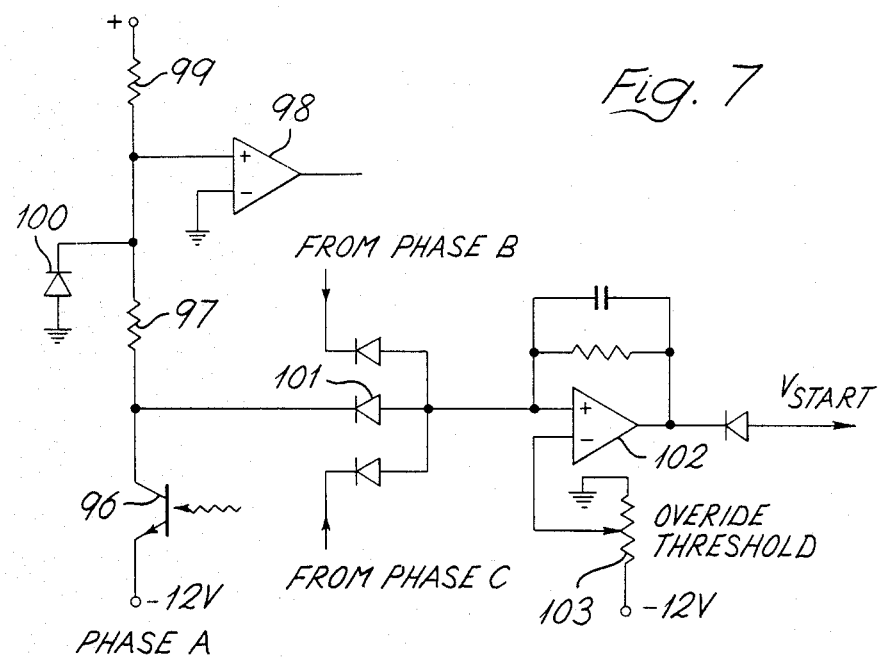

Certain embodiments of the invention will now be described by way of example, with reference to the accompanying drawings in which:

FIG. 1 is a block circuit diagram of a power controller according to the invention, FIGS. 2a to 2j are waveforms used in explaining the operation of FIG. 1, FIGS. 3a to 3d show various ways in which an induction motor can be supplied from a three phase supply, FIGS. 4a to 4l show waveforms which arise in operating an induction motor connected as shown in FIG. 3c, FIG. 5 is a block diagram of another controller according to the invention, FIG. 6 is a circuit diagram of an alternative arrangement for the amplifier 19 and the sample circuit 23 of FIG. 1, and FIG. 7 is a circuit diagram of threshold detectors which may be used in a modified form of FIG. 5.

In FIG. 1 an induction motor 10 is supplied from an a.c. mains supply 11 by way of a triac 12. One side of the motor 10 is connected by way of a switch 13 to a terminal 14 of the power supply 11. The other terminal 15 of the power supply 11 is connected to the triac 12.

Trigger pulses are supplied to the triac 12 by a trigger pulse generator 16 which generates trigger pulses when the output of a comparator 17 indicates that the voltage from a ramp generator 18 has just exceeded the output voltage of a differential amplifier 19. The trigger pulse generator 16, the comparator 17 and the ramp generator 18 are commercially available in a number of integrated circuits designed for triggering triacs in power controllers.

It is required to delay trigger pulses when the power factor of the motor falls and this is achieved by means of a comparator 21, a monostable circuit 35, a sample and hold circuit 22 and the difference amplifier 19. The comparator 21 detects the time instant X (see FIG. 2c) when the triac 12 ceases to conduct. The lag $\phi$ between the supply voltage falling to zero at Z (see FIG. 2a) and the point X depends on the load on the motor and on the firing instant F. If the triac is fired earlier, the cessation of current at X occurs later and vice versa. Also increase in load on the motor reduces the lag and vice versa.

The voltage waveform across the triac (see $V_T$ in FIG. 2e) is used to determine the time instant X. The voltage across the motor is shown in FIG. 2d and it is the same as the supply voltage when the triac is conducting. At other times the voltage does not fall to zero because the motor is still rotating and a voltage is induced in the motor stator. At such times the voltage across the triac $V_T$ (see FIG. 2e) is equal to the difference between the supply voltage and the induced voltage. It will be seen from the waveform of FIG. 2e that steps occur in the triac voltage when conduction commences and ceases. The latter of these steps is used to indicate phase lag $\phi$ (see FIG. 2b) in the way which is now described.

The voltage across the triac is applied to the comparator 21 giving an output for the comparator 21 as shown in FIG. 2f. Each time the output of the comparator 21 changes from positive to negative the monostable circuit 35 generates one of the sampling pulses shown in FIG. 2g and the sample and hold circuit 22 samples the output voltage of the ramp generator 18 (shown in FIG. 2h). (Alternatively, a sampling spike may be more simply obtained by differentiating the output of comparator 21 with a CR circuit.) However the output voltage of the sample and hold circuit 22 is obtained by subtracting the ramp voltage ($V_X$) at the time the sample is taken from the reference voltage ($V_{REF}$) obtained from a potentiometer 24.

The output of the sample and hold circuit 22 is applied to the inverting (−) input of the differential amplifier 19.

In operation, when the lag $\phi$ (between the points Z and X of FIGS. 2a and 2c) increases due to reduction in load on the motor, the sampled ramp voltage $V_X$ increases in magnitude since it is taken at a higher magnitude point in the output voltage of the ramp generator 18 (as shown in FIG. 2h). $V_X$ is subtracted from $V_{REF}$ so that the error signal output of the sample and hold circuit 22 falls but this is applied to the inverting input of the differential amplifier 19 so that the output of this amplifier increases. Trigger pulses are thus produced later in each supply voltage cycle since such pulses are produced at the point F in FIG. 2h when the ramp generator just exceeds the voltage applied by the differential amplifier 19. Thus the triac then fires later in the supply cycle which shortens its conduction period, reduces the power input to the motor, and opposes the increase in lag $\phi$ due to the change in load on the motor. This maintains the power factor and efficiency of the motor and also acts to return the power factor and the lag $\phi$ to normal operating values which are set by $V_{REF} - V_X = 0$ since any difference is amplified by the full d.c. gain of the differential amplifier 19. The circuit acts to stabilise the motor power factor and phase lag $\phi$ at the phase angle where the sample voltage $V_X = V_{REF}$ and $V_{REF}$ determines the operating phase angle of the motor.

A.c. response is damped by a feedback network consisting of capacitor 27 and two equal resistors 25 and 26 connected to the differential amplifier 19. The d.c. gain of the amplifier 19 is unaffected (typically 60 to 100 dB) but the A.C. gain is reduced to maintain stability of the overall feedback system and produce a smooth response to sudden changes in motor loading without hunting. The amplifier gain at high frequency (above approximately 2 Hz) is unity and gives an immediate response to sudden changes in load and motor phase angle.

The integrated circuit containing the trigger pulse generator 16 is selected from circuits having control logic to prevent the trigger pulse from occurring after the supply voltage crosses zero and Z in FIG. 2a but before the current turns off at X in FIG. 2c. Triggering must occur after the point X otherwise current will turn off at X and not be retriggered until the following half cycle. The integrated circuit may require a connection from a point, such as the output of the comparator 21, where a signal is available indicating whether or not current is flowing in the triac 12. If it is required to use an integrated circuit which does not include such control logic, an equivalent logic circuit should be provided externally.

Further motors can be connected in parallel with the motor 10 up to a maximum of about eight and two such motors 28 and 29 are shown in FIG. 1.

The circuit of FIG. 1 as so far described requires modification for starting and when a number of motors are connected in parallel and started at random. If one motor is running normally at a predetermined phase angle and a second motor is then connected in parallel with the first, the circuit will sense any change in phase angle between the applied voltage and the overall current supplied to the two motors. However, connecting the second motor may increase or decrease the lag depending on the phase lag at which the circuit is operating and on the phase characteristics of the two motors.

In the case of an increase in phase lag the circuit as so far described would response by further delaying firing of the triac and by reducing power to the motors, which might fail to start the newly connected motor, and the current drawn by the stalled motor could lead to dangerous overheating. Even if a decrease in phase lag resulted from connecting a further motor so that the circuit responded by supplying increased power, this might still not be sufficient or rapid enough for satisfactory starting. Thus measurement of phase lag is insufficient to guarantee reliable independent starting of motors in parallel.

To overcome this problem an override system 31 is provided and is operated by the voltage across the triac 12. When the triac is conducting the voltage across it is less than 2 volts and may be considered as essentially zero. when the triac is non-conducting the triac voltage equals the difference between the mains voltage and the voltage across the motor. The latter is not zero because, as stated above, although the current input to the motor startor may have ceased, current is still flowing in the rotor. As it rotates, its magnetic field induces an e.m.f. (the back e.m.f.) in the stator winding which appears across the motor terminals. The voltage across the triac in the non-conducting period is thus the difference between the mains voltage and the induced motor e.m.f. The magnitude of this voltage depends on the rotor current and rotor slip which both depend strongly on the load on the motor and on the motor speed so that the peak value of the voltage across the triac increases immediately on sudden extra loading on the motor or if it shows any tendency towards stalling. For a single stalled motor, for example, or a motor starting from rest, there is no induced e.m.f. and the voltage across the triac equals the full mains voltage. Likewise, when a second motor at rest is connected across a running motor, the voltage across the triac rises immediately in the non-conducting period to a value close to the mains voltage because the very low impedance of the stationary motor loads the induced e.m.f. of the running motor very heavily.

The peak value of the voltage across the triac is thus a sensitive indicator for sensing the connection on-line of a motor for starting and is used to actuate a starting sequence which applies the fully supply voltage for a few seconds to start the motor reliably.

Any rise in the peak value of the voltage $V_T$ across the triac above a predetermined value is sensed by means of a Zener diode 32. The voltage $V_T$ is applied by way of a potentiometer 33 and when the potentiometer voltage rises above the Zener conduction voltage a current flows through the Zener diode 32 and charges a capacitor 34 to create a negative voltage transient at the non-inverting input to the differential amplifier 19. A rectifying diode 36 prevents the capacitor 34 discharging and the charging in reverse during the reverse half cycle of the supply, and Zener diode 37 limits the override signal across capacitor 34. The effect is to reduce the output of the differential amplifier 19 and thus cause the triac to fire earlier in the supply cycle. Subsequently, when, for example, a newly connected motor has speeded up, $V_T$ falls to a lower value and current through the Zener diode 32 ceases. The transient then decays exponentially back to zero and smoothly reduces the motor power to the normal reduced running level. A time constant of a few seconds is suitable for discharge of the capacitor 34 through a resistor 38. A motor which is usually slow in starting results in $V_T$ remaining high throughout the starting period and this sustains the transient applied to the differential amplifier 19 allowing triggering pulses to be applied immediately after current ceases at X (see FIG. 2c) during each supply half cycle throughout the starting period, thus giving the full supply voltage for starting.

Since $V_T$ increases with motor slip, that is decreases in rotor speed, the same circuit allows the full supply voltage waveform to be applied if motor speed drops excessively for any reason, such as abnormal load or operation at too small a lag. This effectively eliminates the possibility that power reduction by the control system may cause a motor to slow excessively or to stall. The override system 31 thus acts as a starting/stalling sensor and as a safety device to override the phase lag controller.

Instead of causing the override circuit to come into operation when the peak voltage across the triac exceeds the voltage of a Zener diode, it may be arranged for the override circuit to operate when the triac voltage exceeds the peak mains voltage less the voltage of a Zener diode. The effect of this is that if the supply voltage drops then so does the threshold triac voltage at which the override circuit operates. This ensures adequate safety margins under conditions of reduced supply voltage.

A preferred alternative arrangement to replace items 19, 22 and 24 to 27 is shown in FIG. 6. The ramp signal from the generator 18 passes to a sample-and-hold circuit 23 which receives a sampling pulse from the monostable 35. The sampled output of the circuit 23 is applied to the non-inverting input of a differential amplifier 19' which has a similar function to the amplifier 19. The reference signal $V_{REF}$ is applied by way of a resistor 25' to the inverting input of the amplifier 19', and the output signal of this amplifier is therefore $V_X - V_{REF}$ amplified, as is that of the amplifier 19 of FIG. 1. In a similar way to FIG. 1 the output $V_{START}$ of the threshold circuit 31 is applied to the amplifier 19' by way of the resistor 25'.

Because the motor 10, the amplifier 19', the comparator 17, the trigger pulse generator 16 and the triac 12 form a feedback loop there is a danger of instability in the overall response. The phase lag $\phi$ of motors responds in a complex way to rapid changes in load and firing point F of the supply triac, and the response also depends on motor construction. It has been found that the response of the amplifier 19' should be one of phase lag at frequencies up to about 2 Hz with gain decreasing at 6 db/octave from high value at zero frequency to around unity at about 2 Hz. The phase lag is imparted by a resistor 26' and a capacitor 27'. As is explained later a resistor 86 and a capacitor 87 are used in controllers for three phase motors.

As has been mentioned the controller can operate many motors in parallel and this is so even with different motors driving different loads such as pumps, drills, compressors and variable loads.

Identical motors driving identical loads operate with the sample phase lag and the power saving is the same as operating each motor with a separator controller. Different motors or identical motors with different loads operated in parallel tend to operate with different phase lags but a triac supplying the motors will cease conduction when the total current reaches zero. The circuit described operates as though this cessation of current indicates overall phase lag and the setting of $V_{REF}$ determines the value of this lag.

The overall phase lag will not necessarily be optimum for each motor but by considering the waveforms for two motors in parallel (FIGS. 2*i* and 2*j* for a first and second motor, respectively) it is seen that the combined current ($I_M$, FIG. 2*c* which is the sum of the currents $I_{M1}$ and $I_{M2}$ of the first and second motors, drops to zero at the point X and conduction through the triac ceases. However, equal but opposite currents continue to flow in the two motors and as shown the first motor draws current from the second motor. In fact, when the triac does not conduct, the second motor is acting as a generator supplying current to the first motor. Thus the first motor which demands power over a greater portion of the main cycle, obtains this during the non-conductive period of the triac from the stored energy in the second motor. In operating the second motor alone, the circuit of FIG. 1 would fire the triac earlier to lengthen the conduction period and cause the current to reach zero at the predetermined phase lag. For the first motor alone the circuit would act in the opposite way. When operating in parallel the requirement for different conduction periods is balanced out by the motors exchanging energy. As long as the conduction periods required are not too different, the improvement in power consumption is not very different from that when the motors are controlled individually.

Figure 2:
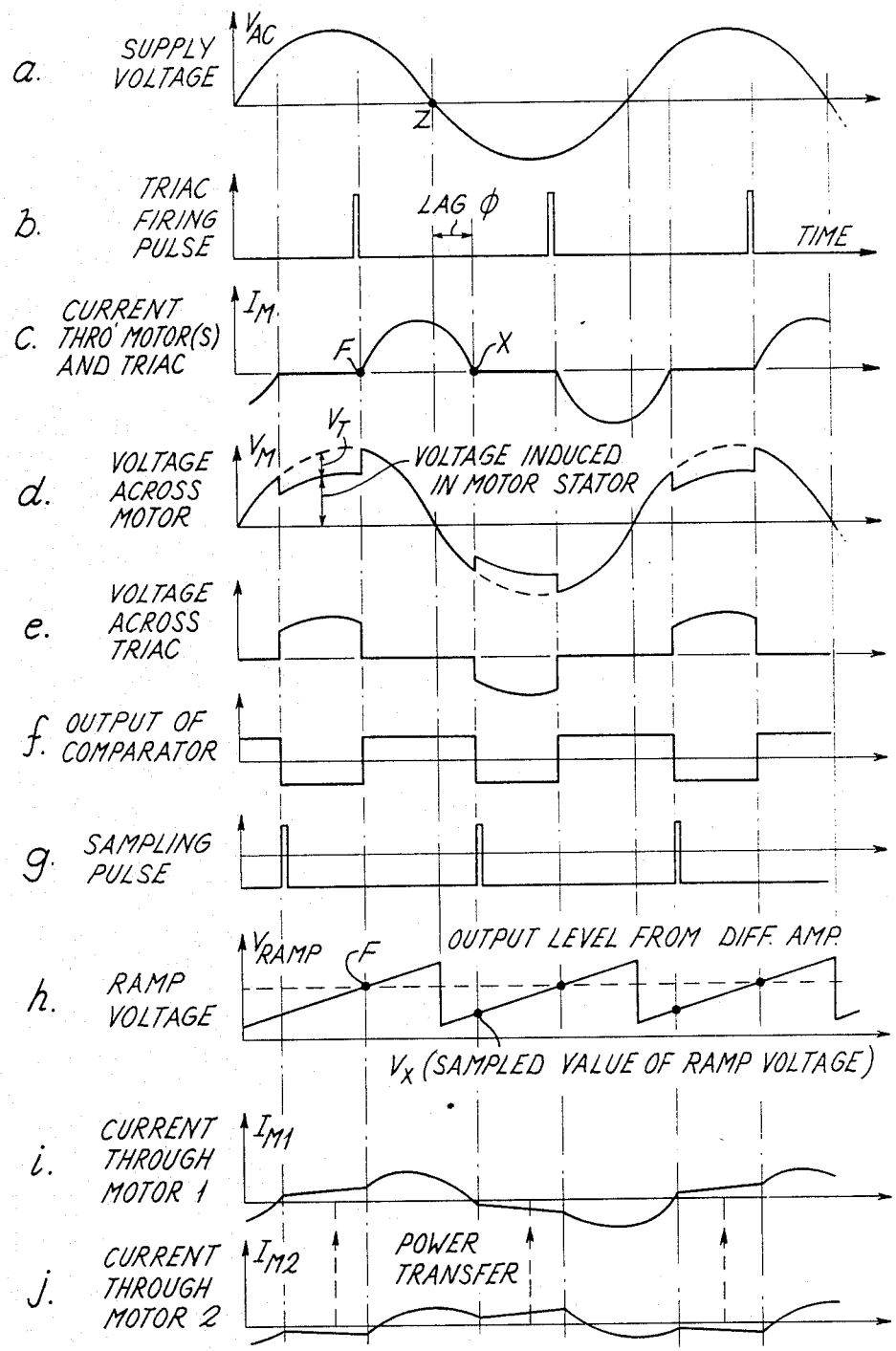

It will be realised that the control system described with reference to FIGS. 1 and 2 can be put into practice in many other ways. For example, the circuit for sensing motor phase angle or the total phase angle of a group of motors may be constructed differently, for example by sensing the voltage and current supplied to the motors. Similarly other override circuits may be adopted.

The control system can also be applied to motors connected to three phase supplies, and in one arrangement each phase has a separator circuit similar to that shown in FIG. 1 except that a single common difference amplifier 19 and a single common override circuit 31 may be used. The difference amplifier is connected as a summing amplifier with three inputs from the three sample and hold circuits 22 and provides a single output signal which is applied to the three comparators 17. Using the single difference amplifier prevents imbalance between power supplied to the various phases. For example an increase in power to one phase may result in a reduction in power to another phase and tend to cause imbalance between the phases. The single override circuit responds to any peak triac phase voltage which exceeds the reference voltage set by the Zener diode 37. To enable grounded common connections and a single override circuit to be used, the triacs are fired via isolating pulse transformers, and the voltages $V_T$ across the triacs, from which the control voltages are derived, are transmitted to the override circuit and the comparators 21 by way of optical isolators driven from the voltages $V_T$ by respective full wave rectifiers. (Similar isolating arragements may be used in the arrangment of FIG. 1.)

In another arrangement the difference amplifier may be driven by signals from one phase only but its output signal may be used for all phases by way of separate comparators 17, trigger pulse generators 16 and triacs 12.

Various ways of connecting a three phase induction motor are shown in FIG. 3. For example in FIG. 3*a* a star connection is shown with triacs 40, 41 and 42 connected in series with star connected induction motor windings 43, 44 and 45. Three line connections L1, L2 and L3 and also a neutral connection N are also shown. Four wires are required for connection to motor terminals 152 to 155 with use of the neutral terminal 155. In FIG. 3*b* a six wire connection to six motor terminals 146 to 151 is used between a controller containing the triacs and the motor itself since in this case the triacs form part of the delta connection. In FIGS. 3*a* and 3*b* each triac conducts independently of the others; for example if the triac 40 in FIG. 3*a* is conducting there is no need for the triacs 41 and 42 to conduct since current can pass by way of the neutral connection N. Similarly in FIG. 3*b* if one triac conducts, a current path is established btween two of the supply lines L1, L2 and L3.

In FIGS. 3*c* and 3*d*, three wire connections are used, with only three wires connecting to the three terminals of the motor. Two problems arise when only three supply wires are used.

The first problem is explained in more detail with reference to the waveforms of FIG. 4 which are simplified waveforms showing time relationships between supply voltage waveforms and the "off" periods, firing points, turn off points and sampling points. In one condition shown in FIGS. 4*d*, 4*e* and 4*f* the non-conducting period of each triac is such that there are always two triacs conducting so that for example when phase A is conducting strongly at 60 phases B and C are each taking small amounts of current as shown at 61 and 62. If however the non-conducting periods are increased the condition shown in FIGS. 4*g*, 4*h* and 4*i* is reached where the current in waveform A falls to zero at 63 as the current in phase B ceases at 64 and phase C is fired at 65. The waveforms of FIGS. 4*g*, 4*h* and 4*i* are a transition to the state shown in the waveforms of FIGS. 4*j*, 4*k* and 4*l* when the conducting periods have been reduced to the point where phase A cannot conduct during an interval 66 because the triac in phase B cease to conduct at instant 67 and the triac in phase C has not yet been fired at 68. The phase A triac therefore switches off and cannot conduct, when required at the end of the interval 66 and the motor would come to rest.

This problem is overcome by causing the triacs to fire in pairs. For example when current is to flow in phase C and the triac 52 is to be fired at point 68 then the triac 50 in phase A is also fired as indicated by the arrow 70. Similar firing pairs can be deduced from FIGS. 4*j*, 4*k* and 4*l* and are shown in Table 1.

TABLE 1

| Primary triac | A | B | C | |
|---|---|---|---|---|
| Secondary triac | B | C | A | (Supply sequence -L1-L2-L3-L1-) |
| Secondary triac | C | A | B | (Supply sequence -L1-L3-L2-L1-) |

The primary triac in row 1 of this table indicates the triac which would normally be fired, the secondary triac in row 2 indicates the triac which should also be fired when the supply sequence is as given in the fifth column, and the third row of the table gives the secondary triac which should also be fired when the supply sequence is reversed.

When the triacs are fired according to this scheme, it is apparent from FIGS. 4*j*, 4*k* and 4*l* that the triac currently considered as a secondary triac was that triac last considered as a primary triac. Thus each pair of triacs fired consists of the one which would "normally" be fired plus the one which was the last to be fired "normally".

FIG. 5 includes the connections necessary to implement Table 1, where three controllers 71, 72 and 73 are shown, one for each of phases A, B and C respectively, connected to respective supply lines L1, L2 and L3. Only the controller 71 is shown in detail, the other two controllers 72 and 73 being similar. The controllers 71, 72 and 73 are each the same as the controller of FIG. 1 except that a single common difference amplifier 19 and associated components, a common threshold circuit 31 and a common detector for direction of rotation 74 are provided, together with additional circuits 75, 76, 83, 84 and 85. The component circuits of the controller 71 are designated in the same way as FIG. 1 where their function is the same.

The voltage output held by each sample circuit 22 is applied by way of one of three resistors: the resistor 25 and corresponding resistors for the other controllers. The average error signal is developed at the junction of the three resistors and applied to the inverting input of the amplifier 19.

Table 1 shows that with the first supply sequence when the triac 50 for phase A fires it should also fire the triac 51 for phase B. This is arranged by passing the triggering signal for the phase A triac 50 from the trigger pulse generator 16 to an AND gate 75. The normal direction of rotation is taken to be the sequence in the second row of Table 1 and this is detected by the direction detector 74. For the normal direction of rotation, then, the AND gate 75 is opened and the triac 51 is triggered at the same time as the triac 50. Another AND gate 76 receiving inputs from the trigger pulse generator 16 and the reverse terminal of the direction detector 74 is connected to trigger the triac 52 of phase C for the other supply sequence as shown in Table 1.

The other phase controllers 72 and 73 have respective pairs of gates corresponding to the gates 75 and 76 coupled to their trigger pulse generators (TPGs) and these gates have outputs to the trigger terminals of the triacs of other phases as indicated in FIG. 5. The trigger pulses are applied by way of respective isolating pulse transformers (not shown) having secondaries connected to the trigger terminals of the triacs.

The direction detector circuit 74 receives two of the supply voltage waveforms. These sinusoidal waveforms are limited to produce symmetrical square waves, in phase with the respective supply waveforms. The square waves are applied to logic in order to produce the normal (N) and reverse (R) signal. The logic may comprise a D-type clock flip-flop which is connected to receive one square wave at its data input and the other after differentiation, at its clock input.

The second problem which arises when only three supply wires are used, concerns the measurement of phase lag between the instant the supply voltages reaches zero (relative to neutral) and the instant when the triac current reaches zero. As is explained above variations in this phase lag accompany changes in motor load and are used by the controller to fire the triacs to meet motor load variations.

Unfortunately when two triacs turn off, the resulting turn off and cessation of current in the third triac does not occur at the natural phase lag value for cessation of current in this phase. Rather the turn off is imposed by the cessation of current in the other two triacs. In measuring phase lag this premature turn off must be ignored and this is achieved by omitting to sample the phase lag during periods when the corresponding triac has been prematurely turned off.

For example in FIG. 4j the current waveform of phase A is prematurely terminated at the beginning of the interval 66 and since the comparator 21 uses the voltage increase across the triac 50 when it goes open circuit to cause phase measurement by sampling the waveform from the ramp 18, a false phase measurement will occur at the beginning of the interval 66.

This problem is overcome by inhibiting sampling at certain times, for example in the normal phase sequence when the triac 52 of phase C is off it inhibits sampling in the controller 71 for phase A as indicated by a broken arrow 80 in FIG. 4k. The full scheme for inhibiting sampling is shown in Table 2 for both the normal direction of phase sequence (row 2) and the reverse sequence (row 3).

TABLE 2

| Signal causing inhibiting | A off | B off | C off |
| --- | --- | --- | --- |
| Phase sampling inhibited (Supply sequence -L1-L2-L3-L1-) | B | C | A |
| Phase sampling inhibited (Supply sequence -L1-L3-L2-L1-) | C | A | B |

However a further problem arises in that since the beginning of an interval 81 in waveform 4l and the natural end of conduction in phase A shown in waveform 4j at point 82 coincide, the cessation of conduction in phase C which inhibits sampling in phase A would also inhibit sampling at the point 82. This problem is avoided by delaying the inhibiting waveform long enough to allow sampling to occur at the point 82 but not long enough to prevent sampling at a time such as the beginning of the interval 66. Such an arrangement functions correctly because current always ceases in the phase which is to control inhibition well before inhibition is required but ceases at the same time at which undesired inhibition could occur.

In FIG. 5 an inhibiting signal for the controllers 72 and 73 is generated from the comparator 21 of the controller 71. The output of this comparator is 'low' when the triac 50 is not conducting (see the waveform of FIG. 2f) and it is delayed in a resistance capacitance delay circuit 83 before being passed to the controllers 72 and 73. Corresponding inhibiting signals are received by AND gates 84 and 85 from delay circuits of the controllers 72 and 73, respectively. The gates 85 and 84 also receive enabling signals from the direction detector 74 corresponding to normal and reverse rotation respectively. The output of the monostable circuit 35 indicating when sampling of the ramp waveform from the generator 18 should take place is passed to the gates 84 and 85 and only reaches the sample circuit 22 when one of these gates ie enabled.

Since intervals of non-conduction by triacs occur after they have been initially triggered, such as the interval 66 in FIG. 2j, further triggering by the trigger pulse generator 66 must be prevented although the ramp voltage from the generator 18 exceeds the output of the amplifier 19. This can be achieved by including logic which inhibits the generator 16 after each trigger pulse until a zero crossing occurs in the power supply. Such logic is available in some of the aforementioned integrated circuits containing the generators 16 and 18 and the comparator 17. The logic mentioned above for inhibiting primary trigger pulses while the triac is conducting is also required.

Although the invention has been specifically described with reference to the arrangement of FIG. 5 it will be clear that it can be put into use in many other ways, for example with the motor connected in three-wire delta (see FIG. 3d). The connections to the triacs are then as shown in FIG. 5, that is each comparator 21 is connected across a respective one of the triacs, with the trigger connected to the corresponding trigger pulse generator 16, and each ramp generator 18 and each input of the direction detector 74 connected to a respective one of the line terminals L1, L2 and L3. Terminals 90, 91 and 92 of FIG. 3d are then the same as terminals 93, 94 and 95, respectively, of FIG. 5.

It is an important advantage of the controller of FIG. 5 that it can be used with a motor of the type shown in FIG. 3d where the motor may have only three external terminals. This advantage arises because in the present invention phase lag may be measured in the supply line as opposed to the motor windings (the latter requiring four or six wire connection to the motor).

A conventional starter may be interposed between the triacs 50 to 52 and the motor windings A, B and C but in many applications the controller described makes such starters unnecessary. The controller may also be placed between a starter and the motor.

It is usually preferable to replace the threshold circuit 31 of FIG. 5 by a threshold circuit of the type shown in FIG. 7, which responds to the voltage across the triacs in each phase of the controller. A photo-transistor 96 which forms part of an optical isolator in the connection between the triac 50 and the comparator 21 is connected by way of a relatively low value resistor 97 (for example 2 Kohms) to the non-inverting input of an amplifier 98 forming the comparator 21. A relatively high value resistor 99 (for example 200 Kohms) connects the non-inverting input to a positive supply and the junction between the resistors 97 and 99 is connected to earth by way of a diode 100. The photo-transistor 96 is also connected by way of a diode 101 to a differential amplifier 102 whose input is also fed from similar circuits for phases B and C.

In normal operation the current through the photo-transistor 96 is low corresponding to the low voltage $V_T$ (see FIG. 2d) across the triac 50. The voltage across the resistor 99 varies in accordance with this current since the diode 100 remains back biassed and the output of the amplifier 98 is low (negative) when the triac 50 is not conducting (see FIG. 2f). However when the voltage across the triac 50 rises considerably due to, for example, a tendency towards stalling, the non-inverting input of the amplifier 98 is held to the forward bias voltage across diode 100, and voltage is developed across resistor 97 proportionate to the voltage across the triac 50. When the volage at the junction of resistor 97 and photo-transistor 96 becomes more negative than the override threshold voltage set by a potentiometer 103, the diode 101 conducts and the output of the amplifier 102 goes negative to provide a voltage $V_{START}$ which is fed to amplifier 19 (FIG. 6) to cause increased voltage to the motor. Thus if a tendency to stall is indicated by any phase, a voltage is applied to the amplifier 19 to cause the trigger pulses to be applied immediately after a zero crossing occurs in the supply waveform.

Preferably the circuit of FIG. 6 is used instead of the amplifier 19 and the circuits 22. To overcome instability problems in three phase systems, phase lead is advantageous and sometimes essential at frequencies between about 6 Hz and 70 Hz (gain increasing at 6 db/octave). This may be introduced by the resistor 87 and the capacitor 86.

Circuits other than those of the type shown in FIG. 1 may be used for measuring phase lag.

Other switching means such as parallel connected oppositely poled thyristor pairs or a thyristor connected to the d.c. terminals of a full wave rectifier may be used instead of triacs.

The or each switching means may be in the form of a single thyristor and may then be used in parallel with a diode, so that triggering is carried out in half cycles having one polarity but current flows automatically through the diode in half cycles having the other polarity without triggering.

The invention is also applicable to three phase motors connected in parallel when all corresponding terminals of all star or delta connected motors are supplied by way of one switching means which may comprise a triac or a group of triacs in parallel all receiving triggering signals at the same time. Thus three switching means are required, for each group of parallel connected motors. If more than two three phase motors are to be connected in parallel and started independently it is advisable to ensure that for an interval when each motor is started, the triacs are fired immediately zero crossings in the power waveform occur. Motor starters usually have a pair of extra contacts which are closed on starting and these contacts in all starters may be connected in parallel to cause a voltage similar to that obtained from the threshold circuit 31 of FIG. 1 to be applied to the non-inverting input of the amplifier 19 for a suitable interval.

I claim:

1. A power controller for an induction motor which is coupled to an alternating current supply operating at a predetermined frequency, comprising:
    at least one SCR device, each said SCR device connected between a phase of said alternating current supply and the induction motor to be energized from the supply, one SCR device being provided for each phase of the supply, each said SCR device also including a trigger input for trigger signals for turning on said SCR device;
    ramp generating means for generating a ramp waveform with a frequency double said predetermined frequency of said alternating current supply;
    means for detecting zero crossings of a voltage waveform of one phase of said alternating current supply;
    synchronizing means, connected to said ramp generating means, for synchronizing zero crossings of said ramp waveform with said zero crossings in the voltage waveform of said one phase of the alternating current supply;
    detecting means, coupled to said phase of said alternating current supply, for detecting when a current in said one phase of the supply ceases;
    sample and hold means, coupled to said ramp generating means and said detecting means, for sampling and holding a voltage of said ramp waveform from said ramp generating means each time said current cessation is detected, said sampled and held voltage being a monitoring signal, proportional to intervals between said zero crossing of said voltage waveform in said one phase of the supply, and a cessation of current in said one phase which preceeds current reversal therein;
    a first comparator, connected to said sample and hold means, for comparing said monitoring signal with a reference signal to derive an error signal indicative of a difference between said error signal and said reference signal; and control means, connected to said SCR devices and to said first comparator, for generating said trigger signals to said SCR devices responsive to said error signal, to change a time relationship between a waveform of the supply and the trigger signals in a direction to shorten a period of conduction of the switching means when said interval increases, and lengthen said period of conduction when said interval decreases.

2. A power controller according to claim 1, wherein said control means includes:
a second comparator, connected to said ramp generating means and to said first comparator, for comparing said ramp waveform from said ramp generating means with said error signal from said first comparator and producing an output signal that changes state based on whether said ramp waveform is greater than or less than said error signal; and
generator means, connected to said second comparator, for generating said trigger signals in response to said output signal of the second comparator,
whereby the said ramp waveform is used by said sample and hold means to derive said monitoring signal and is used by said generator means to generate said trigger signals.

3. A controller as in claim 2, wherein said detecting means comprises voltage monitor means, coupled across said SCR device, for detecting a voltage step across said SCR device when said SCR device ceases to conduct; and
said first comparator comprises signal deriving means for providing a signal representative of a time interval between a zero crossing in the supply voltage and a time at which a next voltage step occurs across said SCR device.

4. A controller as in claim 2 further comprising:
reference signal generating means, coupled to said first comparator, for generating said reference signal; and
said control means comprises means for changing a level of said reference signal in order to change a time relationship of said error signal.

5. A power controller as in claim 2 further comprising means for inhibiting trigger signals after a first trigger signal has occurred, and until a next return waveform edge occurs synchronized with a zero crossing in a supply voltage.

6. A power controller according to claim 4 further comprising:
means for detecting a back e.m.f. of said motor;
means for determining if said back e.m.f. indicates a tendency of said motor to stall; and
means for changing said reference value in order to lengthen said interval when said motor is tending to stall.

7. A power controller as in claim 6, wherein said means for changing the reference value comprises a diode and a Zener diode connected to said SCR device, and a capacitor in series with said Zener diode.

8. A power controller for an induction motor which is coupled to an alternating current supply operating at a predetermined frequency, comprising:
at least one SCR device, each said SCR device connected between a phase of said alternating current supply and the induction motor to be energized from the supply, one SCR device being provided for each phase of the supply, each said SCR device also including a trigger input for trigger signals for turning on said SCR device;
ramp generating means for generating a ramp waveform with a frequency double said predetermined frequency of said alternating current supply;
means for detecting zero crossings of a voltage waveform of one phase of said alternating current supply;
synchronizing means, connected to said ramp generating means, for synchronizing zero crossings of said ramp waveform with said zero crossings in the voltage waveform of said one phase of the alternating current supply;
detecting means, coupled to said phase of said alternating current supply, for detecting when a current in said one phase of the supply ceases;
sample and hold means, coupled to said ramp generating means and said detetecting means, for sampling and holding a voltage of said ramp waveform from said ramp generating means each time said current cessation is detected, to derive a monitoring signal proportional to intervals between said zero crossing in the voltage waveform in said one phase of the supply, and a cessation of current in said one phase which preceeds current reversal therein;
a first comparator, connected to said sample and hold means, for comparing said monitoring signal with a reference signal to derive an error signal indicative of a difference between said error signal and said reference signal;
a second comparator, connected to said ramp generating means and said first comparator, for comparing said ramp waveform from said ramp generating means with said error signal from said first comparator and producing an output signal indicative of which is greater; and
generator means, connected to said second comparator, for generating said trigger signals in response to said output signal of the second comparator,
whereby the said ramp waveform is used by said sample and hold means to derive said monitoring signal and is used by said generator means to generate said trigger signals.

9. A method of operating a power controller for an induction motor which is coupled to an alternating current supply, comprising the steps of:
connecting one SCR device, which has a trigger input for trigger signals to turn on said SCR device, between each phase of said alternating current supply and the induction motor to be energized from the supply;
generating a ramp waveform with a frequency double a frequency of said alternating current supply;
detecting zero crossings of a voltage waveform of one phase of the alternating current supply;
synchronizing said ramp waveform to have zero crossings that are synchronized with said zero crossings in the voltage waveform of said one phase of the alternating current supply;
detecting when a current in said phase of the supply ceases;
sampling and holding a voltage of said ramp waveform each time said current cessation is detected, to derive a monitoring signal proportional to intervals between the zero in the voltage waveform in said one phase of the supply and a cessation of current in said phase which proceeds current reversal therein;

comparing the monitoring signal with a reference signal; deriving an error signal indicative of a difference between said monitoring signal and said reference signal;

comparing said ramp waveform from said ramp generating means with said error signal; and generating said trigger signals in response to an output of the second comparator, whereby the said ramp waveform is used both to derive said monitoring signal and is used to generate said trigger signals.

10. A power controller for an induction motor which is coupled to an alternating current supply, comprising:

at least one SCR device, each said SCR device connected between a phase of said alternating current supply and the induction motor to be energized from the supply, one SCR device being provided for each phase of the supply, each said SCR device also including a trigger input for trigger signals for turning on said SCR device;

current detecting means for detecting a current in at least one of said SCR devices;

voltage detecting means for detecting a supply voltage applied to said at least one SCR device;

monitor means, coupled to said at least one SCR device and to said current detecting means and said voltage detecting means, for deriving a monitor signal representative of a phase lag of said detected current in said at least one SCR device, behind said detected supply voltage thereof;

reference generating means for producing a reference signal;

error-detection means, connected to said monitor means and said reference generating means, for deriving an error signal indicative of a relationship between said monitor signal and said reference signal;

trigger pulse generator means, connected to said SCR devices and said error detection means, for generating said trigger signals for said SCR devices in response to said error signal;

detector means, connected to said SCR devices, for detecting a back e.m.f. of the motor;

comparison means, connected to said detection means, for comparing said back e.m.f. with a threshold value representative of a back e.m.f. value when the motor tends to stall; and override means, connected to said detector means and said comparison means and actuated by said back e.m.f., for lengthening a conduction period of said SCR device when said motor back e.m.f. falls below said threshold value.

11. A power controller according to claim 2, wherein said control means includes direction-detection means for indicating a sequence in which the voltages of the supply phases become positive, and secondary logic means for each phase, coupled to receive input signals from the direction-detection means and from said first comparator for providing primary trigger signals for said each phase, said secondary logic means of said each phase supplying secondary trigger signals to one of the switching means of the other phases in dependence upon its input signals.

12. A power controller according to claim 11 including means for suppressing at least use of the monitoring signals whenever current through a switching means ceases but next flows again in the same direction.

13. A power controller according to claim 11 further comprising:

a ramp generating means detecting means, synchronizing means, current detecting means, sample and hold means, and comparator for each phase, and the power controller includes means for suppressing at least use of the monitoring signals of a phase when the switching means of the preceding phase in the sequence in which the phase supply voltages go positive, is not conducting.

14. A power controller according to claim 13 wherein said means for suppressing use of the monitoring signals includes suppression logic means for each phase coupled to receive input signals from direction-detection means and, by way of delay means, from the voltage monitor means of the other two phases, the suppression logic means of each phase being connected to suppress the output signal of the voltage monitor means of that phase in dependence upon its input signals.

15. A power controller according to claim 11, further comprising:

two additional ramp generators and second and third comparators, one generator and one comparator for each phase, each ramp generator for each respective phase generating a ramp signal having a repetition frequency equal to twice the frequency of the supply and having return waveform edges which are synchronized with the zero crossings in the supply voltage of that phase, and each comparator for each respective phase, in operation, comparing the ramp signal from the ramp generator of that phase with a signal dependent on the monitoring signal to provide a primary trigger signal when the signals applied to that comparator bear a predetermined magnitude relationship to one another;

direction-detection means for indicating the sequence in which the voltages of the supply phases become positive, and secondary logic means for each phase coupled to receive input signals from the direction-detection means and from said comparator which provides primary trigger signals for that phase, the secondary logic means of each phase supplying secondary trigger signals to one of the switching means fo the other phase in dependence upon its input signals.

16. A method of controlling an induction motor which is coupled to an alternating current supply, comprising the steps of:

connecting one SCR device including a trigger input for trigger signals for turning on said SCR device for each phase of the supply between a phase of said alternating current supply and the induction motor to be energized from the supply, one SCR device being provided for each phase of the supply;

detecting a current in at least one of said SCR devices;

detecting a supply voltage applied to said at least one SCR device;

deriving a monitor signal representative of a phase lag of said detected current in said at least one SCR device behind said detected supply voltage thereof;

producing a reference signal;

deriving an error signal indicative of a relationship between said monitor signal and said reference signal;

comparing said back e.m.f. with a threshold value representative of a back e.m.f. value when the motor tends to stall; and lengthening a conduction period of said SCR device when said motor back e.m.f. falls below said threshold value.

17. A power controller for a three-phase induction motor supplied by three wires comprising:

three switching means for connection between an alternating current electrical supply and an induction motor which is to be energized from the supply, there being one switching means for each phase of the supply, and each switching means becoming conductive when a primary trigger signal is applied to that switching means and remaining conductive until said current supplied thereto ceases, each of said three switching means, in operation, connected between a phase of a three phase supply and a respective terminal of a star or delta connected induction motor, means for generating a ramp waveform which has a repetition frequency twice that of the supply and has minima synchonized with zero crossings in the voltage waveform of one phase of the supply;

monitor means for deriving a monitoring signal representative of respective intervals between a zero in the voltage waveform of said one phase of the supply and the cessation of current in that phase which precedes current reversal therein, the monitoring means including means for sampling the magnitude of said ramp waveform each time said cessation of current occurs to provide the monitoring signal, means for deriving an error signal from the monitoring signal using a reference signal, control means for generating the trigger signals, said control means being responsive to the error signal to change the time relationship between the supply waveform and the trigger signals in that sense which shortens the conduction period of the switching means when said interval tends to increase and lengthens the said conduction period when said interval tends to decrease;

said control means including means for generating secondary trigger signals at the same time as said primary trigger signals, each secondary trigger signal being applied to that switching means which received the last primary trigger signal; and a power controller including means for suppressing at least use of the monitoring signals whenever current through a switching means ceases but next flows again in the same direction.

18. A power controller for a three-phase induction motor comprising:

three switching means for connection between an alternating current electrical supply and an induction motor which is to be energized from the supply, there being one switching means for each phase of the supply, and each switching means becoming conductive when a primary trigger signal is applied to that switching means and remaining conductive until said current supplied thereto ceases;

three ramp generator means, each for generating a ramp waveform which has a repetition frequency twice that of the supply and has minima synchronized with zero crossings in the voltage waveform of one phase of the supply;

three monitor means, one for each phase, each for deriving a monitoring signal representative of respective intervals between a zero in the voltage waveform of said one phase of the supply and the cessation of current in that phase which precedes current reversal therein, by detecting steps in the voltage across that switching means which occur when that switching means ceases to conduct, the monitoring means including means for sampling the magnitude of said ramp waveform each time said cessation of current occurs to provide the monitoring signal;

three signal-deriving means, one for each supply phase, for providing a signal which is representative of the time interval between a zero crossing in the supply voltage of that phase and the time at which the last voltage step occurs across the switching means for that phase before current reversal in that phase;

control means including three comparators, one for each respective phase, in operation, comparing the ramp signal from the ramp generator of that phase with a signal dependent thereon to provide a primary trigger signal when the signals applied to that comparator bear a predetermined magnitude relationship to one another;

direction-detection means for indicating the sequence in which the voltages of the supply phases become positive, and secondary logic means for phase coupled to receive input signals from the direction-detection means and from said comparator which provides primary trigger signals for that phase, the secondary logic means of each phase supplying secondary trigger signals to one of the switching means of the other phases in dependence upon its input signals;

said control means being responsive to the error signal to change the time relationship between the supply waveform and the trigger signals in that sense which shortens the conduction period for the switching means when the said interval tends to increase and lengthens the said conduction period when the said interval tends to decrease; and means for suppressing at least use of the monitoring signals of a phase when the switching means of the preceding phase in the sequence in which the phase supply voltages go positive, is not conducting.

19. A power controller for a three-phase induction motor which is star or delta connected and supplied by three wires, comprising:

three switching means each for connection between a phase of alternating current electrical supply and an induction motor which is to be energized from the supply, there being one switching means for each phase of the supply, and each switching means becoming conductive when a primary trigger signal is applied to that switching means and remaining conductive until said current supplied thereto ceases, three ramp generating means, each for generating a ramp waveform which has a repetition frequency twice that of the supply and has minima synchronized with zero crossings in the voltage waveform of one phase of the supply, three voltage monitoring means, each for deriving a monitoring signal representative of respective intervals between a zero in the voltage waveform of one phase of the supply and the cessation of current in that phase which precedes current reversal therein, by detecting steps in the voltage across that switching means which occur when that switching means ceases to conduct, each monitoring means including means for sampling the magnitude of said ramp waveform each time said cessation of current occurs to provide the monitoring signal, three signal-deriving means, one for each supply phase, for providing a signal which is representative of the time interval between a zero crossing in the supply voltage of that phase and the time at which the last voltage step occurs across the switching means for that phase before current reversal in that phase;

control means for generating said primary trigger signals, including three comparators, one for each respective phase, each in operation, comparing the ramp signal from the ramp generator of that phase with a signal dependent on the monitoring signal to provide a primary trigger signal when the signals applied to that comparator bear a predetermined magnitude relationship to one another;

direction-detection means for indicating the sequence in which the voltages of the supply phases become positive, secondary logic means for each phase coupled to receive input signals from the direction-detection means and from said comparator which provides primary trigger signals for that phase, the secondary logic means of each phase supplying secondary trigger signals to one of the switching means of the other phases in dependence upon its input signals, said control means being responsive to the error signal to change the time relationship between the supply waveform and the trigger signals in that sense which shortens the conduction period of the switching means when said interval tends to increase and lengthens said conduction period when said interval tends to decrease; and wherein the control means includes means for generating secondary trigger signals at the same time as said primary trigger signals, each said secondary trigger signal being applied to that switching means which received that last primary trigger signal.

* * * * *